United States Patent [19]
Tamura et al.

[11] Patent Number: 5,197,325
[45] Date of Patent: Mar. 30, 1993

[54] MISFIRING DETECTION SYSTEM FOR INTERNAL COMBUSTION ENGINES

[75] Inventors: Hideyuki Tamura; Takashi Aramaki, both of Kanagawa, Japan

[73] Assignee: Nissan Motor Company, Limited, Yokohama, Japan

[21] Appl. No.: 709,573

[22] Filed: Jun. 4, 1991

[30] Foreign Application Priority Data

Jun. 5, 1990 [JP] Japan .............................. 2-59554[U]
Jun. 5, 1990 [JP] Japan .................................... 2-146610

[51] Int. Cl.$^5$ ............................................ G01M 15/00
[52] U.S. Cl. .................................................... 73/117.3
[58] Field of Search ................. 73/117.2, 117.3, 118.1; 123/419, 436

[56] References Cited

U.S. PATENT DOCUMENTS 4,697,561 10/1987 Citron ............................. 123/436 X
4,782,692 11/1988 Peden et al. ......................... 73/117.3

FOREIGN PATENT DOCUMENTS

57-188748 11/1982 Japan .

*Primary Examiner*—Jerry W. Myracle
*Attorney, Agent, or Firm*—Foley & Lardner

[57] ABSTRACT

An engine misfiring detection system includes a crank angle sensor for generating a reference pulse representative of a reference crank angle position in each cylinder of the engine, and a ring gear sensor for monitoring a magnitude of crank angle rotated from the reference crank angle position so as to define a first crank angle position required for starting an angular velocity measurement for an engine crankshaft and a second crank angle position required for ending the angular velocity measurement. A controller is provided to determine an engine misfiring state on the basis of fluctuations in a measuring time reaching from the first crank angle position to the second crank angle position. The controller variably sets the first and second crank angle positions in response to changes in an ignition timing of the engine. The controller determines a tooth defect in the ring gear on the basis of a ratio of said measuring time and a time interval necessary to reach from the reference crank angle position in relation to a firing cylinder to the reference crank angle position in relation to the subsequent cylinder.

11 Claims, 10 Drawing Sheets

MISFIRING DETECTION SYSTEM FOR INTERNAL COMBUSTION ENGINES

BACKGROUND OF THE INVENTION

1. Field of the Invention

The present invention relates to a misfiring detection system for internal combustion engines, which can detect an engine misfiring by monitoring fluctuations in an angular velocity of an engine crankshaft. Specifically, the present invention is directed to a system capable of reliably detecting an engine misfire by means of a ring gear sensor for monitoring an angular velocity of an engine crankshaft.

2. Description of the Prior Art

Recently, there have been disclosed and developed misfiring detection systems for internal combustion engines. Such misfiring detection is required for optimal combustion control for an internal combustion engine. As is generally known, when a cylinder of the engine is misfiring, unburnt gas is exhausted and consequently harmful components in the exhaust gas are increased, thereby resulting in lowering of the engine output and increased pollution. Furthermore, if the combustion control is achieved in such a manner as to increase an intake air amount with a high step-response during infrequent engine misfiring, an idle speed of the engine becomes unstable and thereby results in hunting. Therefore, a precise misfiring detection is required to determine whether infrequent misfiring occurs, whether a particular cylinder is constantly misfiring, and what cylinder is misfiring. As set forth above, such a misfiring detection is advantageous to optimally control various combustion conditions, such as an ignition timing and an intake air amount. For example, Japanese Patent First Publication (Tokkai) Showa 57-188748 discloses an engine misfiring detection system for an automotive vehicle, which can detect misfiring occurring in a cylinder of the engine by monitoring fluctuations in an angular velocity of an engine crankshaft by means of an electromagnetic pick-up, even when the vehicle is in a running state. Such a conventional misfiring detection systems includes a rotary disc fixed on the crankshaft and employing diametrically opposing tabs radially projecting from an outer periphery thereof and two non-contact microswitches provided in different angular positions offset from each other by a predetermined relative phase angle, for example 90°, in such a manner as to be in close proximity to the tabs, respectively. The prior art misfiring detection system determines the engine misfiring on the basis of an angular velocity difference between angular velocities derived from pulse signals output by the non-contact microswitches. However, in the above mentioned conventional misfiring detection system employing the rotary disc fixed on the crankshaft, since tab installation points and non-contact microswitch installation positions are fixed, two measuring timings for starting and ending angular velocity measurement for an engine crankshaft achieved by the microswitches are also fixed.

Figure 3:
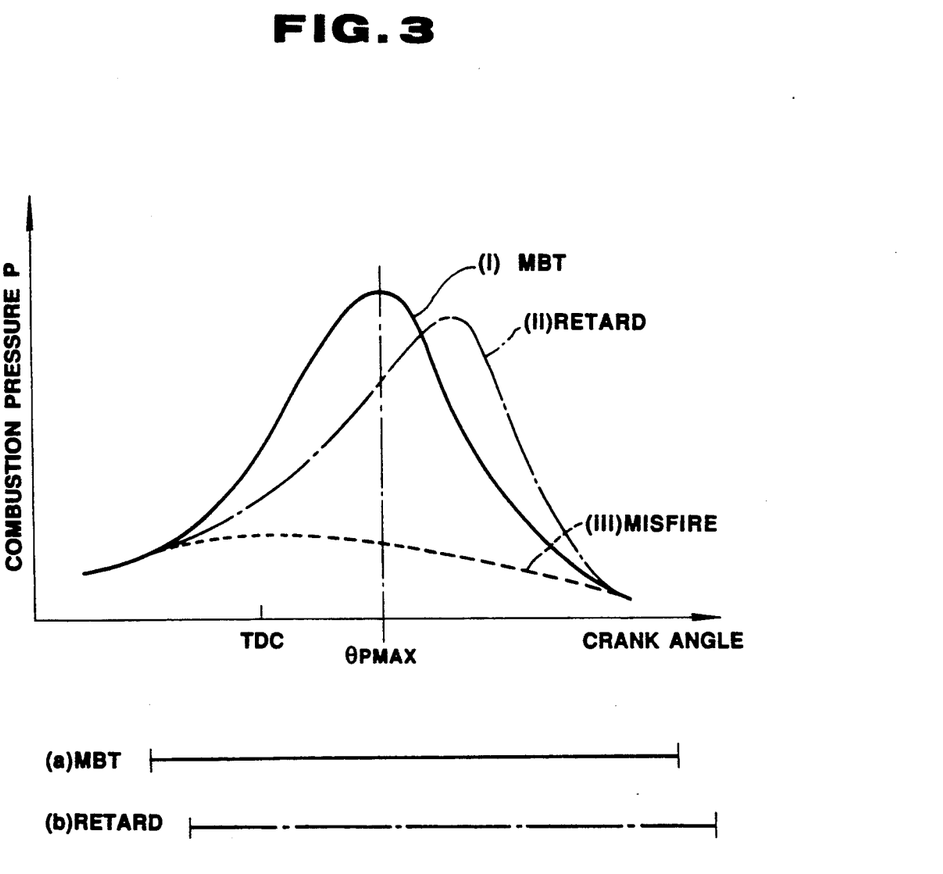
FIG. 3 is a graph illustrating a combustion pressure P in relation to a crank angle, in three combustion states, namely a MBT state wherein the ignition timing is controlled in accordance with the MBT, a RETARD state wherein the ignition timing is retarded from the MBT, and a MISFIRE state wherein the engine is misfiring. In addition.

As is well known, ignition timing for an internal combustion engine is generally varied in response to various engine operating conditions, such as engine load and engine speed. If the ignition timing is controlled in accordance with a minimum spark advance required for obtaining best torque in an engine operating state, the crank angle $\theta_{PMAX}$ corresponding to a maximum combustion pressure is essentially kept constant, as seen in a solid line (i) of FIG. 3 illustrating changes in a combustion pressure P in relation to a crank angle. The aforementioned minimum spark advance required for best engine torque will be hereinafter abbreviated as a "MBT". On the other hand, if the engine is misfiring, a waveform of the combustion pressure P remarkably fluctuates and the pressure P is rapidly lowered as shown in a broken line (iii) of FIG. 3. The combustion pressure drop causes fluctuations in the angular velocity of the crankshaft. As a result, engine misfiring is detected by monitoring the fluctuations in the angular velocity.

As shown in a dot and dash line (ii) of FIG. 3, if the ignition timing is retarded from the MBT in accordance with various controls for enhancing both of driving stability and riding comfort, such as a knocking control executed for avoiding an excessive knocking occurrence and a shift-shock suppressing control executed for reducing shift-shock occurring during shifting in an automatic transmission, the crank angle $\theta_{PMAX}$ is also varied towards a retardation crank angle position. Therefore, if the previously described measuring timings for starting and ending the angular velocity measurement are fixed as shown in a timing chart (a) of FIG. 3, the monitored angular velocities are affected by the varied waveform of the combustion pressure P. In this case, fluctuations in the angular velocity can be detected irrespective of misfiring occurrences. This causes an erroneous determination for engine misfiring. In this manner, reliability for misfiring detection may be lowered in the prior art misfiring detection systems. Furthermore, it is difficult to precisely monitor extremely slight fluctuation in the angular velocity of the crankshaft by means of the electromagnetic pick-up.

In order to precisely monitor the previously noted slight fluctuations of angular velocity, there has been proposed another type of conventional misfiring detection system wherein a combination of the above noted rotary disc fixed on the crankshaft and non-contact microswitches are replaced with a combination of a ring gear and a ring gear sensor provided in close proximity to a toothed portion formed on the outer periphery of the ring gear (flywheel gear teeth). The ring gear sensor generates pulse signals in proportion to the number of teeth of the ring gear passing therethrough. In such conventional ring gear type misfiring detection systems, a misfiring state is determined on the basis of fluctuations in a measuring time necessary to monitor a predetermined number of teeth passing through the ring gear sensor, so as to insure high accuracy for monitoring the angular velocity of the crankshaft. Unless the ring gear has a tooth defect, the ring gear sensor type misfiring detection system is superior to the rotary disc type misfiring detection system with regard to measuring accuracy, because the angular velocity measurement of the ring gear type misfiring detection system is achieved by utilizing the outermost peripheral toothed portion of the ring gear having an extremely large diameter. However, since the ring gear teeth engage with a drive-pinion of the starting motor for engine starting, there is a possibility of a ring gear tooth defect. If a tooth defect, such as a broken, bent or displaced tooth for example, occurs, the ring gear sensor outputs an erroneous pulse signal and, as a result, an engine misfiring may be erroneously determined. Furthermore, there is a possibility that the ring gear sensor is deactivated due to a defect in a wiring harness necessary for the ring gear sensor. If such a harness defect, as noted above, occurs, engine misfiring cannot be detected.

SUMMARY OF THE INVENTION

It is, therefore in view of the above disadvantages, an object of the present invention to provide an engine misfiring detection system capable of reliably detecting engine misfiring even when the vehicle is moving.

It is another object of the invention to provide an engine misfiring detection system for monitoring engine misfiring with a high detection accuracy, irrespective of changes in ignition timing.

It is a further object of the invention to provide a ring gear type engine misfiring detection system which can discriminate a ring gear sensor malfunction.

It is a still further object of the invention to provide a ring gear type engine misfiring detection system which can prevent misfiring detection accuracy from lowering due to a defect in teeth of the ring gear (flywheel gear teeth).

In order to accomplish the aforementioned and other objects, a misfiring detection system for an internal combustion engine according to the present invention includes: means for generating a reference pulse in synchronization with a reference crank angle position in each cylinder of the engine; means for monitoring a magnitude of crank angle rotated from the reference crank angle position so as to define a first crank angle position required for starting an angular velocity measurement for an engine crankshaft and a second crank angle position required for ending the angular velocity measurement; means for monitoring and deriving a measuring time necessary to reach from the first crank angle position to the second crank angle position; means for determining an engine misfiring state on the basis of fluctuations in the monitored measuring times; and means for variably setting the first and second crank angle positions in response to changes in an ignition timing of the engine.

The means for monitoring the magnitude of crank angle includes a ring gear sensor provided in close proximity to a toothed portion formed on an outer periphery of a ring gear, for monitoring the number of ring gear teeth passing.

The engine misfiring detection system may include means for determining a tooth defect in the ring gear in a particular crank angle range defined between the first and second crank angle positions, on the basis of a ratio of a first statistical data derived by dividing a deviation of a series of the measuring times by a simple mean value of the same series of the measuring times and a second statistical data derived as a moving average of the first statistical data. The tooth defect determining means determines that, when the ratio of the first and second statistical data is within a predetermined range defined by a formula $(m+p)/m \pm \alpha$, wherein m denotes the number of the ring gear teeth corresponding to the particular crank angle range and p denotes the number of a defective teeth and $\alpha$ represents a predetermined allowable error in the ratio $(m+p)/m$, tooth defect occurs with a number p of defective teeth within the particular crank angle range.

The measuring time deriving means includes means for compensating the measuring time by correcting the second crank angle position expanded from the particular crank angle range by the number of defective teeth.

The engine misfiring detection system further may include means for determining a tooth defect in the ring gear within a particular crank angle range defined between the first and second crank angle positions, on the basis of a ratio of the measuring time and a time interval necessary to reach from the reference crank angle position in relation to a firing cylinder to the reference crank angle position in relation to a subsequent cylinder. The time interval is defined as a time interval between leading edges of the adjacent reference pulses monitored in the vicinity of timings for starting and ending the angular velocity measurement in relation to the measuring time. The tooth defect determining means determines that, when the ratio of the measuring time and the time interval is within a predetermined range, the tooth defect occurs within the particular crank angle range.

The means for determining the tooth defect on the basis of the ratio of the first and second statistical data, includes means for determining whether one complete cycle for monitoring the measuring time in synchronization with a reference pulse terminates reliably before a next reference pulse is generated subsequently to the previous reference pulse.

According to another aspect of the invention, a misfiring detection system for an internal combustion engine includes: a crank angle sensor for generating a reference pulse in synchronization with a reference crank angle position in each cylinder of the engine; a ring gear sensor for monitoring a magnitude of crank angle rotated from the reference crank angle position so as to define a first crank angle position required for starting an angular velocity measurement for an engine crankshaft and a second crank angle position required for ending the angular velocity measurement; the ring gear sensor provided in close proximity to a toothed portion formed on an outer periphery of a ring gear, in such a manner as to monitor the number of ring gear teeth passing; means for monitoring and deriving a measuring time necessary to reach from the first crank angle position to the second crank angle position; means for determining an engine misfiring state on the basis of fluctuations in the monitored measuring times; and means for determining a tooth defect in the ring gear within a particular crank angle range defined between the first and second crank angle positions, on the basis of a ratio of the measuring time and a time interval necessary to reach from the reference crank angle position in relation to a firing cylinder to the reference crank angle position in relation to a subsequent cylinder. The time interval is defined as a time interval between leading edges of the adjacent reference pulses monitored in vicinity of timings for starting and ending the angular velocity measurement in relation to the measuring time.

BRIEF DESCRIPTION OF THE DRAWINGS

In the drawings:

FIG. 3 shows two timing charts (a) and (b) illustrating two measuring timings for starting and ending an angular velocity measurement for an engine crankshaft, in both the above noted MBT and RETARD states.

DESCRIPTION OF THE PREFERRED EMBODIMENTS

Figure 1:
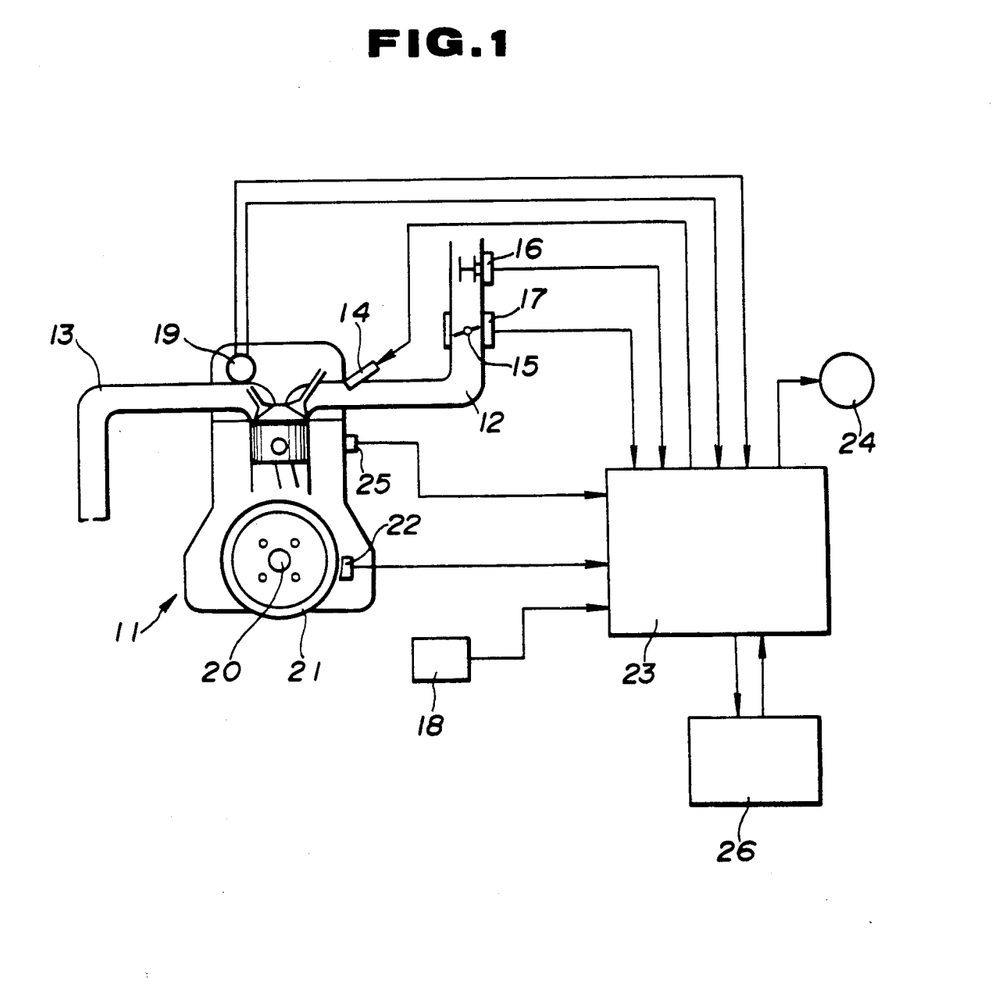
FIG. 1 is a block diagram illustrating a preferred embodiment of an engine misfiring detection system according to the invention.

Referring now to the drawings, particularly to FIG. 1, an engine misfiring detection system according to the invention is applicable for monitoring misfiring occurring in an in-line six-cylinder, four-stroke-cycle engine 11, for example. The engine 11 employs an intake manifold 12 and an exhaust manifold 13, respectively attached to a cylinder head thereof. A fuel-injection valve 14 is provided in each branched intake air passage of the intake manifold 12 so as to supply fuel to each intake port. A throttle valve 15 is provided in the intake manifold 12 and an air flow meter 16, such as a hot-wire type air flow meter, traditionally provided upstream of the throttle valve 15, for monitoring an intake air amount. In the vicinity of the throttle valve 15, a throttle valve opening angle sensor 17 is provided for monitoring a throttle valve opening angle TVO.

Reference numeral 18 denotes a vehicle speed sensor 18 for monitoring a vehicle speed VSP. Reference numeral 19 denotes a crank angle sensor mounted on an end of a camshaft or in a distributor, for monitoring a crank angle position of an engine crankshaft 20 and an engine speed Ne. The crank angle sensor 19 also outputs reference pulses as shown in the timing chart (a) of FIG. 2 for monitoring a reference crank angle position, such as a top dead center usually abbreviated as a "TDC", with regard to each cylinder. The crank angle sensor 19 also outputs continuous pulses every unit crank-angle, such as 2°, for monitoring a crank angle position offsetting from the reference crank angle position. On the six-cylinder 4-cycle engine, the respective reference pulses are output every 120° (crank angle) in synchronization with the reference crank angle positions in each cylinder. Actually, the reference pulse is output just before the TDC of the associated cylinder. As seen in the timing chart (a) of FIG. 2, the pulse-width of the reference pulse generated by the crank angle sensor 19 in synchronization with the reference crank angle position of each cylinder is inherent. That is, a cylinder number associated with the reference pulse generated just before the reference crank angle position, can be discriminated by its inherent pulse-width. As set forth above, it is advantageous to utilize the aforementioned reference pulses as a reference crank angle position indicative signal for each cylinder.

The embodiment of the engine misfiring detection system according to the invention includes a ring gear sensor 22 provided in close proximity to a toothed portion formed on the outer periphery of a ring gear 21. An electromagnetic pick-up is preferably used as the ring gear sensor. The ring gear is traditionally provided in a rear end of the crankshaft 20 in such a manner as to engage with a drive-pinion of a starting motor (not shown) for engine starting. The respective adjacent ring gear teeth are arranged at a regular interval, such that one interval corresponds to a predetermined crank angle, for example 6°. The ring gear sensor 22 generates a sinusoidal current (alternating current) in response to the passage of the ring gear teeth and outputs rectangular pulses wave-shaped from the sinusoidal current. In this manner, the ring gear sensor 22 generates a pulse train as seen in the timing chart (b) of FIG. 2. In the case of the crank angle sensor mounted on the camshaft, the previously noted continuous pulses generated by the crank angle sensor 19 slightly fluctuate due to a predetermined backlash required for a valve-mechanism (not shown). Therefore, it is difficult to detect engine misfiring on the basis of the continuous pulses generated from crank angle sensor. Alternatively, since the ring gear sensor 22 monitors an angular velocity of the ring gear 21 directly connected to the crankshaft 20, it is possible to precisely detect fluctuations in the angular velocity of the crankshaft 20.

A controller 23, generally having a microcomputer, receives signals from the above noted sensors, namely the air flow meter 16, the throttling opening angle sensor 17, the vehicle speed sensor 18, the crank angle sensor 19, and the ring gear sensor 22. The controller 23 executes various control operations, such as an ignition timing control, an air-fuel ratio control and the like. The fuel-injection valve 14 is actuated in accordance with the air-fuel ratio control. The ignition timing control includes a knocking control executed on the basis of signals caused by a knocking sensor 25, which monitors undesirable vibrations occurring during engine knocking, a shift-shock suppressing control executed on the basis of an ignition timing retardation indicative signal generated by an automatic transmission control unit 26 during shifting-up or shifting-down, a pitch suppressing control for suppressing pitching of the vehicle body during quick acceleration or deceleration, and the like.

The ignition control operation of the controller 23 will be hereinafter described in brief.

Basic ignition timing indicative data are stored in the controller 23 memory in data-map fashion in relation to engine operating conditions such as an engine speed Ne and an engine load derived on the basis of a basic fuel injection amount Tp, both serving as control parameters. Therefore, the basic ignition timing is suitably varied in accordance with changes in both control parameters. If engine knocking takes place when the ignition timing is held at a basic ignition timing, the ignition timing is compensated in a retardation direction by a slight retardation angle $A_1$ so as to hold it at a critical ignition timing wherein engine knocking starts to occur when the ignition timing advances from the critical ignition timing. Under this condition, when the vehicle is quickly accelerated, a current ignition timing for a certain cylinder is temporarily retarded by a slight retardation angle $A_2$ so as to suppress pitching of the vehicle body. In addition, if the controller 23 receives the ignition timing retardation indicative signal from the automatic transmission control unit 26 during shifting, the ignition timing is retarded by a slight retardation angle $A_3$ so as to reduce shift-shock. Therefore, a final ignition timing becomes a crank angle obtained by subtracting an entire retardation angle $(A_1+A_2+A_3)$ from the basic ignition timing.

The input interface of the controller 23 utilized in the engine misfiring detection system of the embodiment is also connected to the ring gear sensor 22 to monitor an angular velocity of the engine crankshaft on the basis of pulses generated by the sensor 22 and to determine engine misfiring on the basis of fluctuations in the monitored angular velocity. If the controller 23 determines that the engine is misfiring, a warning device, such as a warning lamp 24 seen in FIG. 1, is activated and a misfiring state is memorized in the controller.

Figure 2:
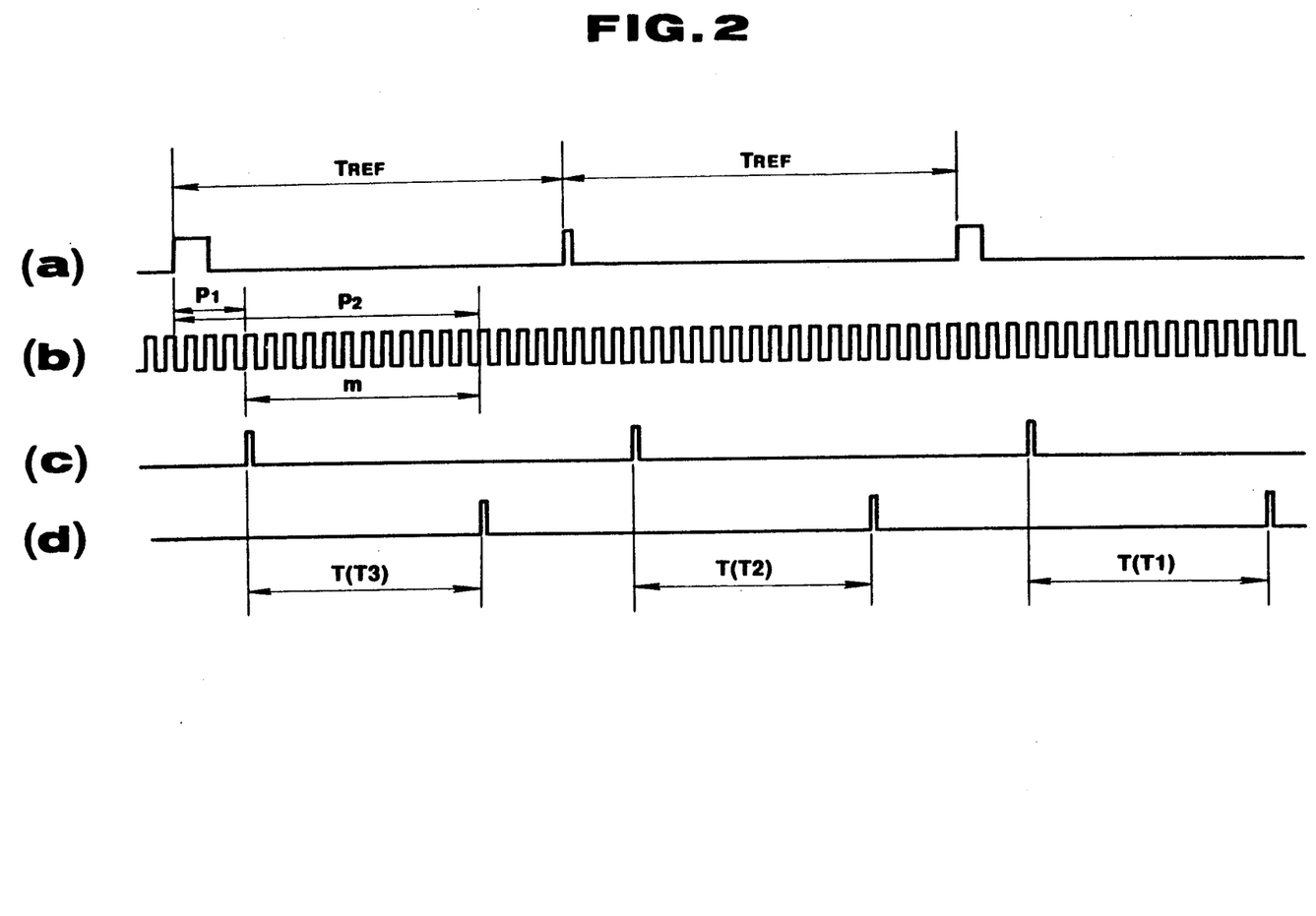
FIG. 2 (including parts a–d) is a timing chart illustrating various pulses generated by the engine misfiring detection system of the embodiment.

Referring now to FIG. 2, an angular velocity of the crankshaft, monitored in a particular crank angle range in each cylinder is derived by monitoring a measuring time T necessary to go from a first measuring timing (corresponding to a first crank angle position in a cylinder) for starting angular velocity measurement of the crankshaft to a second measuring timing (corresponding to a second crank angle position in the same cylinder) for ending the angular velocity measurement, in accordance with the following order.

As seen in the timing chart (a) of FIG. 2, the reference pulses are output from the crank angle sensor 19 every 120° in synchronization with the reference crank angle positions in each cylinder. Thereafter, the number of pulses output from the ring gear sensor 22 are counted. When the counted pulse-number reaches a first predetermined number $P_1$ of teeth of the ring gear, corresponding to the previously noted first measuring timing or the first crank angle position for starting the angular velocity measurement, a first trigger pulse is output from a preset counter (not shown) employed in the controller 23, as seen in the timing chart (c) of FIG. 2. Subsequently, when the counted pulse-number reaches a second predetermined number $P_2$ of teeth, corresponding to the previously noted second measuring timing or the second crank angle position for ending the angular velocity measurement, a second trigger pulse is output from the preset counter, as seen in the timing chart (d) of FIG. 2. This means that the crankshaft 20 rotates by a particular phase angle, corresponding to a predetermined number $(P_2-P_1)$ of teeth for a measuring time T necessary to reach from the leading edge of the first trigger pulse to the leading edge of the second trigger pulse. The measuring time T is measured by a timer (not shown) employed in the controller 23. In the embodiment, the predetermined number $(P_2-P_1)$ of teeth is fixed to a constant value m so as to insure a high angular velocity measurement accuracy. The constant value m corresponds to a number of teeth necessary to monitor the angular velocity. The measuring time T is monitored every 120° (crank angle) in response to the reference pulses generated in synchronization with the reference crank angle positions of the respective cylinders. In the preferred embodiment, only the number $(N+1)$ of data in relation to the measuring time T is stored in the memory of the controller 23. N denotes the number of cylinders. For example, N is equal to 6 in an in-line six-cylinder, four-cycle engine. A series of data $T(N+1), T(N), \ldots, T(3), T(2)$ and $T(1)$, representative of the time T are stored, in that order. Note that the datum $T(1)$ corresponds to the newest measuring time T, while the datum $T(N+1)$ corresponds to the oldest measuring time T. Since N denotes the number of cylinders, the two data $T(1)$ and $T(N+1)$ indicate the measuring times T in relation to the same cylinder. That is, the datum $T(N+1)$ indicates a measuring time monitored one cycle before (corresponding to two crankshaft revolutions or 720°), in relation to the same cylinder. These data are renewed in turn. Engine misfiring detection is achieved on the basis of the measuring time data $T(1)$ through $T(N+1)$.

Figure 4:
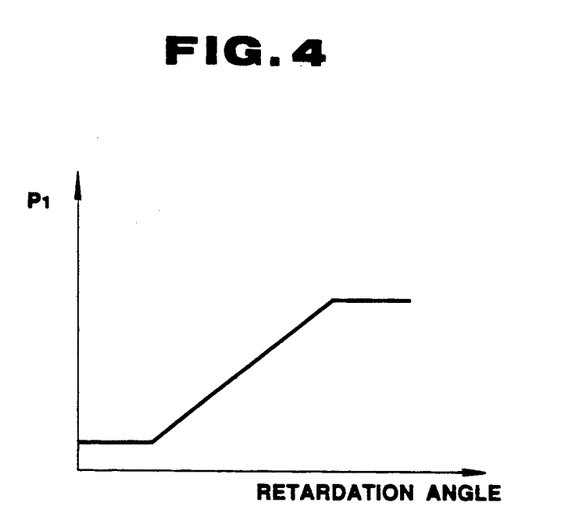
FIG. 4 is a graph illustrating an angular position $P_1$ for starting the angular velocity measurement in relation to a retardation angle of the ignition timing.
Figure 5:
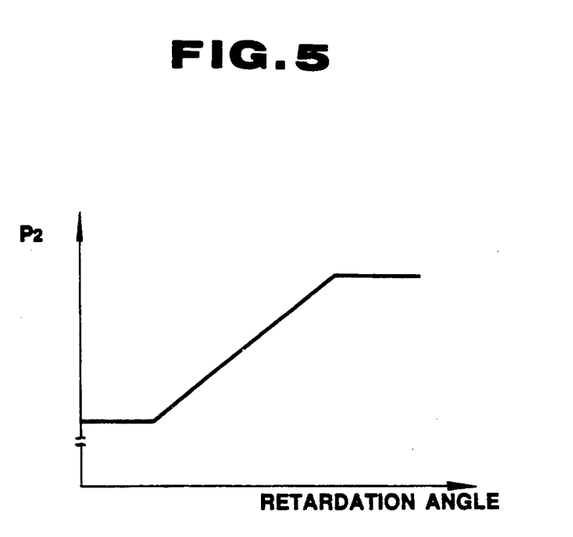
FIG. 5 is a graph illustrating an angular position $P_2$ for ending the angular velocity measurement in relation to the retardation angle of the ignition timing.

As seen in the timing chart (a) of FIG. 3, the previously noted particular crank angle range expanding between the first and second crank angle positions for starting and ending the angular velocity measurement is basically selected so as to match a crank angle range substantially corresponding to a combustion stroke wherein fluctuations in the angular velocity of the crankshaft can be clearly monitored. Note that, in the engine misfiring detection system according to the invention, the particular crank angle range for monitoring the measuring time T is slightly varied in dependence on a retardation angle of the ignition timing, serving as a control parameter. That is, as shown in FIGS. 4 and 5, a predetermined data table, representative of the first and second preset values $P_1$ and $P_2$ respectively corresponding to the first and second crank angle positions in relation to the retardation angle, is stored in the controller 23. The preset values $P_1$ and $P_2$ are read out in response to the entire retardation angle $(A_1+A_2+A_3)$ as previously described, for example. As appreciated from FIGS. 4 and 5, both preset values $P_1$ and $P_2$ are selected so as to an increase substantially in proportion to increase in the retardation angle with the result that the particular crank angle range for monitoring the measuring time T is also retarded as seen in the timing chart (b) of FIG. 3. In this manner, the misfiring detection system according to the invention can effectively reduce or compensate fluctuations in angular velocity due to retardation of the ignition timing. Since a drop point in the combustion pressure P is substantially constant irrespective of changes in the ignition timing, the respective preset values $P_1$ and $P_2$ are essentially fixed to predetermined maximum values as illustrated in the rightmost horizontal lines of FIGS. 4 and 5 when the retardation angle is in a relatively large retardation angle range.

Figure 6:
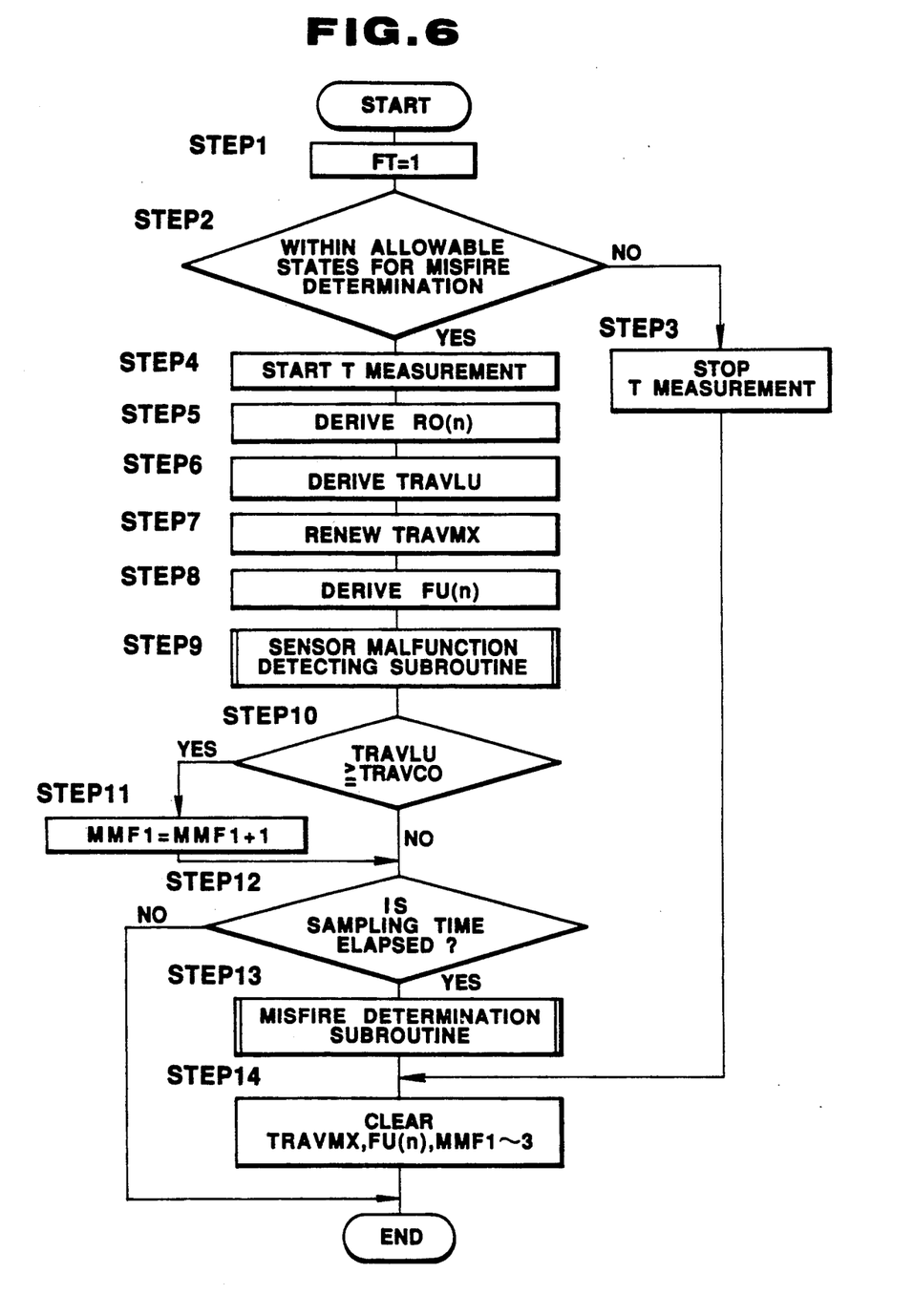
FIG. 6 is a main flow chart illustrating a main routine executed by a controller employed in the misfiring detection system according to the invention.

Referring now to FIG. 6, the main routine executed in the controller 23 for the engine misfiring detection is described below in accordance with the flow chart. The main routine is started as soon as one complete cycle for monitoring the above noted measuring time T is finished. That is, the main routine is actually repeated in synchronization with the trailing edge of the second trigger pulse as seen in the timing chart (d) of FIG. 2.

In step 1, a flag FT is set to '1' when one complete cycle for monitoring the measuring time T in synchronization with a reference pulse terminates certainly before a next reference pulse subsequent to the previous reference pulse is generated by the crank angle sensor 19. That is, FT=1 means that the above noted one complete cycle of the time T measurement is reliably or normally finished. Conversely, FT=0 means that the one complete cycle of the time T measurement is not still finished due to a defect in a wire harness for supplying a desired voltage to the ring gear sensor, for example.

In step 2, a test is made to determine whether various states necessary for an engine misfiring detection are satisfied. When the answer to step 2 is affirmative, that is, all states are within allowable states for misfiring detection, step 4 proceeds wherein a measurement for the previously noted measuring time T is started and the measuring time T is stored in the memory in the controller. When the answer to step 2 is negative, that is, allowable states for misfiring detection are not satisfied, step 3 proceeds wherein the time T measurement is stopped. Thereafter, the procedure flows from step 3 to step 14 as described herebelow in detail.

Figure 7:
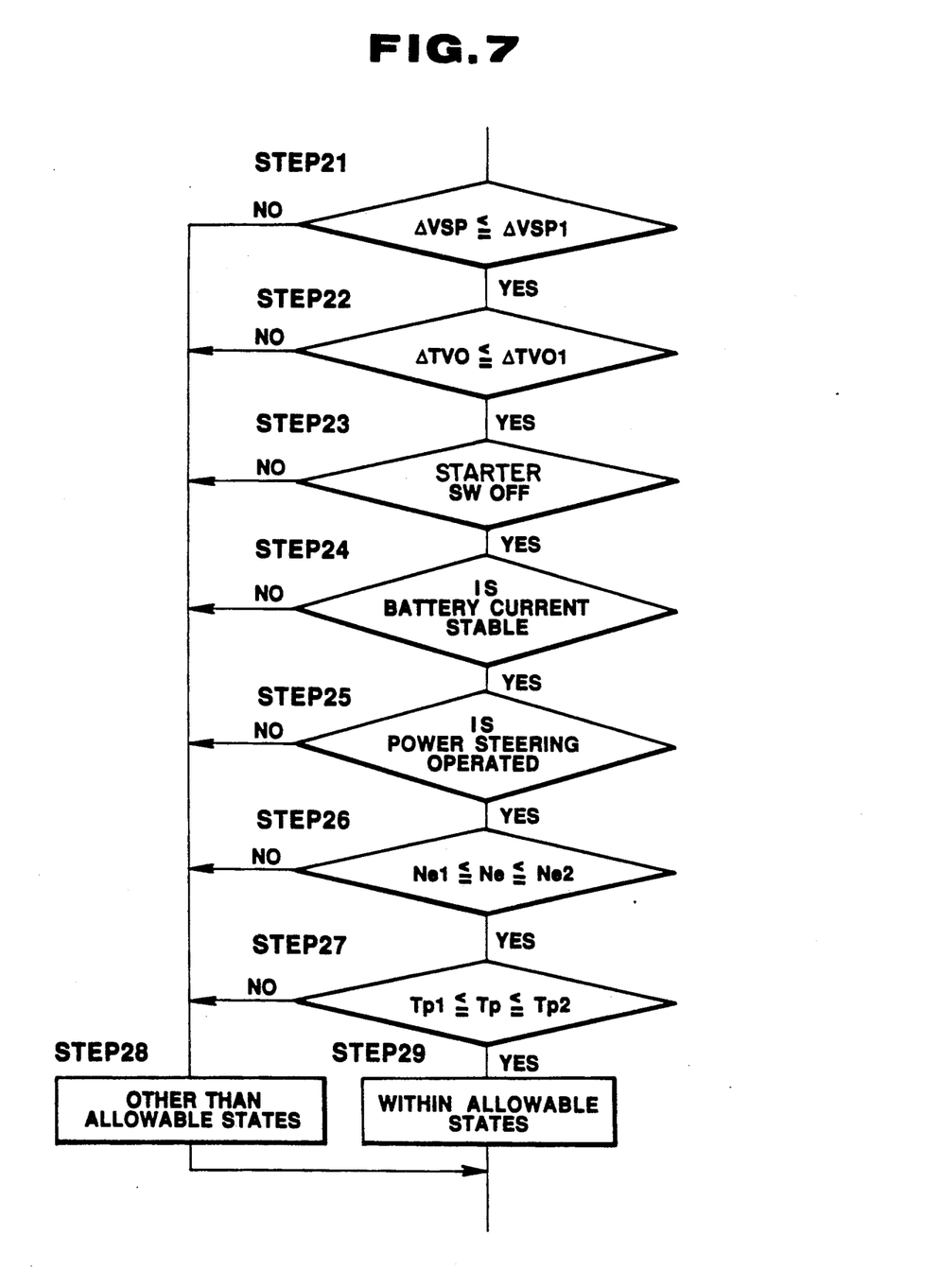
FIG. 7 is a flow chart illustrating a subroutine executed by the controller to determine whether various states necessary for misfiring detection are satisfied.

Returning to step 2 of FIG. 6, the allowable states for misfiring detection are determined in accordance with a flow chart of FIG. 7, for example. Through the respective steps 21 to 27 of FIG. 7, various tests are made to determine whether fluctuations in the angular velocity of the engine crankshaft occur due to factors other than engine misfiring.

In step 21, a test is made to determine whether a rate $\Delta$VSP of change in a vehicle speed VSP is less than a predetermined threshold $\Delta$VSP1.

In step 22, a test is made to determine whether a rate $\Delta$TVO of change in a throttling valve opening angle TVO is less than a predetermined threshold $\Delta$TVO1.

In step 23, a test is made to determine whether a starter switch is OFF.

In step 24, a test is made to determine whether a battery current is stable. For example, the answer to step 24 becomes negative since the battery current is temporarily lowered just before any electricity-consuming device, such as lights, are connected to the battery by way of a switch therefor.

In step 25, a test is made to determine whether power steering is operated.

In step 26, a test is made to determine whether an engine speed Ne is within a predetermined range of Ne1 to Ne2, i.e., the engine speed Ne is held substantially constant.

In step 27, a test is made to determine whether a basic fuel injection amount Tp is within a predetermined range of Tp1 to Tp2, i.e., the basic fuel injection amount Tp is substantially constant.

When all of the aforementioned necessary conditions are satisfied, step 29 proceeds wherein the controller determines that conditions for engine misfiring detection are within allowable states. When at least one of the all necessary conditions is not satisfied, step 28 proceeds wherein the controller determines conditions to be other than allowable states for engine misfiring detection.

Returning to FIG. 6, after the answer to step 2 is affirmative, i.e., the previously noted all necessary conditions for engine misfiring detection are satisfied and the measuring time data is stored at step 4, step 5 is entered wherein a degree of roughness RO representative of statistical data based on a deviation of a series of measuring times T is calculated on the basis of the memorized measuring time data T1 through T(N+1). The roughness degree RO is derived in accordance with the following formula.

$$RO = \frac{\{T(N/2 + 1) - T(N + 1)\} + \{T(N/2 + 1) - T1\}}{\{T1 + T2 + \ldots + T(N)\}/N}$$

As previously described, N denotes the number of a cylinder in an internal combustion engine, T(N/2) denotes a central data of the measuring time data T1 to T(N+1). As appreciated from the formula, the numerator of the formula represents the deviation of a series of measuring times T and the denominator of the formula represents a simple mean value of the same series of measuring times T. The deviation of the time T is calculated based on the central data T(N/2). In this manner, since both of the new data T1 and the old data T(N+1), measured one cycle before in relation to the same cylinder, are utilized for deriving the deviation of the measuring time T, the roughness degree RO is not susceptible to friction loss cyclically occurring in a particular phase angle of the crankshaft. In the above noted formula for the roughness degree RO, a value $\{T(N/2+1)-T(N/2)\}$ may be utilized as the numerator of the formula, or a value T(N/2) or $\{(T1+T2+\ldots+T(N/2))\times 2\}/N$ may be utilized as the denominator of the formula. The derivation of the roughness degree RO is executed in synchronization with the reference pulse output from the crank angle sensor 19. Therefore, a roughness degree RO(n) is defined as a degree of roughness derived in response to a reference pulse generated in relation to a cylinder having a cylinder number n. The roughness degree RO(n) is derived in turn in accordance with a firing order used in the engine.

As appreciated from the previously noted formula of the roughness degree RO, if the engine crankshaft is rotated at a constant speed and the fluctuations in the angular velocity are not detected, the roughness degree RO becomes 0 since the deviation of the measuring time T is essentially zero. If a certain cylinder of the engine is misfiring, the roughness degree RO of the misfiring cylinder becomes negative and the roughness degrees of the other cylinders become positive. The cylinder number n of the roughness degree RO(n) is not always consistent with the misfiring cylinder.

In step 6, a moving average TRAVLU is derived on the basis of absolute values of the respective roughness degrees RO(n) in accordance with the following formula.

$$TRAVLU = \frac{|RO(1)| + |RO(2)| + \ldots + |RO(N)|}{N}$$

The derivation of the moving average TRAVLU is executed in synchronization with the reference pulse.

In step 7, a newly derived moving average TRAVLU is compared with a maximum value TRAVMX of the previously derived moving averages and the maximum value TRAVMX is renewed when the newly derived moving average exceeds the current maximum value. In this manner, the maximum value TRAVMX represents a maximum moving average in one cycle of sampling time of moving average data.

In step 8, a frequency of a positive or negative roughness degree RO(n) in relation to each cylinder is counted and the counted value FU(n) representative of the frequency is dervied such that the counted value FU(n) is incremented when a newly derived roughness degree RO(n) is positive, the counted value FU(n) is decremented when a newly derived roughness degree RO(n) is negative and the counted value FU(n) is held unamended when a newly derived roughness degree RO(n) is zero. Therefore, if misfiring occurs in a particular cylinder having a cylinder number n, the counted value FU(n) in relation to its cylinder is rapidly decreased in a negative direction.

In step 9, a test is made to determine whether the ring gear sensor 22 has malfunctioned due to various factors, such as a defect in the ring gear teeth or a defect in the wire harness for the ring gear. The test executed in step 9 will be hereinafter described in detail in accordance with the flow charts of FIGS. 8, 9 and 10.

In step 10, the previously noted moving average TRAVLU based on the roughness degree RO is compared with a reference value TRAVCO. When the moving average TRAVLU exceeds the reference value TRAVCO, step 11 proceeds wherein a value of a first parameter MMF1 is incremented by 1. The reference value TRAVCO is derived as a moving average of a series of reference values derived from a look-up table of the reference moving average in relation to the engine speed Ne or derived from a data map of the reference moving average in relation to the engine speed Ne and the basic fuel-injection amount Tp. As previously noted, since the moving average TRAVLU represents a moving average in relation to absolute values of the roughness degrees RO, the first parameter MMF1 is dependent on a frequency (the number of occurrence) of the fluctuation in the angular velocity, occurring at a predetermined level or more, with regard to an entire engine including all cylinders.

In step 12, a test is made to determine whether a predetermined sampling time is elapsed. If the answer in step 12 is affirmative, step 13 proceeds wherein a test is made to determine whether the engine is misfiring. The sampling time is restricted by a preset time interval, such as 2 sec or a preset rotation amount of the crankshaft. Therefore, until the predetermined sampling time is elapsed, the procedure of steps 4 to 11 is repeated and as a result the derivation of the moving average TRAVLU is also repeated. After the engine misfiring is determined or judged in step 13, step 14 proceeds wherein the maximum value TRAVMX of the moving average, the counted values FU(n), the first parameter MMF1, and second and third parameters MMF2 and MMF3, are cleared. The definitions of second and third parameters MMF2 and MMF3 are described in detail in accordance with a flowchart of FIG. 11.

Figure 11:
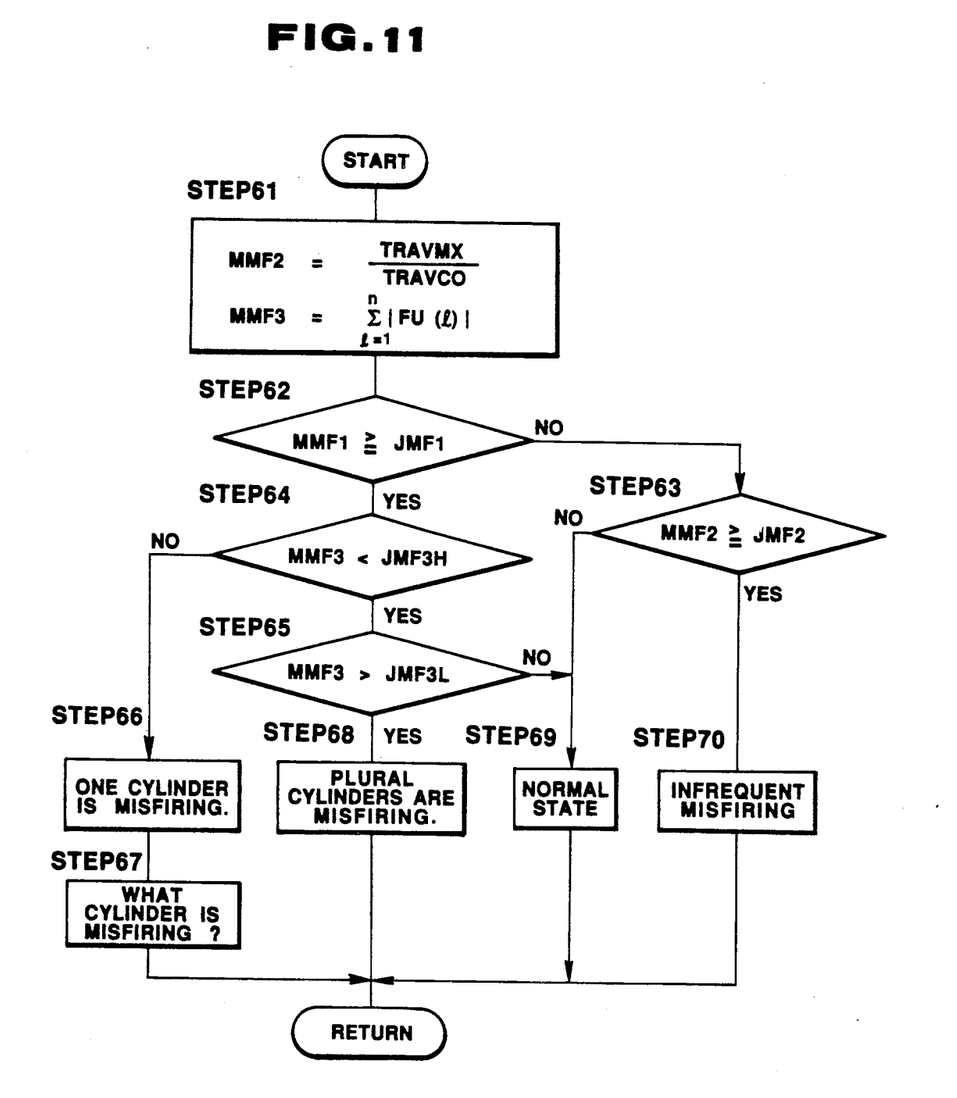
FIG. 11 is a flow chart illustrating a subroutine for precisely determining engine misfiring and for determining a misfiring cylinder.

Referring now to FIG. 11, the procedure for determining the engine misfiring is detailed.

In step 61, two parameters, namely the second parameter MMF2 and the third parameter MMF3 are derived, respectively. The second parameter MMF2 is calculated on the basis of the maximum value TRAVMX of the moving averages derived in one cycle of the sampling time and the reference value TRAVCO derived just before the sampling time is elapsed, in accordance with the following formula.

$$MMF2 = TRAVMX/TRAVCO$$

A relatively large magnitude of the second parameter MMF2 means that a large fluctuation in the angular velocity occurs. That is, a degree of fluctuation in the angular velocity is determined by a value of the second parameter MMF2.

On the other hand, the third parameter MMF3 is defined as the sum of absolute values of the counted values FU(n) as shown in the following formula.

$$MMF3 = |FU(1)| + |FU(2)| + \ldots + |FU(N)|$$

As appreciated from the above formula, the third parameter MMF3 is rapidly increased when an increase or decrease in the angular velocity takes place frequently in the same cylinder, while the third parameter MMF3 is moderately increased when an increase or decrease in the angular velocity takes place randomly in a plurality of cylinders.

In step 62, the first parameter MMF1 derived in step 11 of FIG. 6 is compared with a preset reference value JMF1. If the first parameter MMF1 is less than the preset reference value JMF1, step 63 proceeds wherein the second parameter MMF2 is compared with a preset reference value JMF2. If the second parameter MMF2 is less than the reference value JMF2, step 69 proceeds wherein the controller determines that the engine operates in a normal state, i.e., engine misfiring does not occur. In step 63, if the second parameter MMF2 is equal to or greater than the reference value JMF2, i.e., fluctuations in the angular velocity occuring in the entire engine are extremely low and a relatively large angular velocity fluctuation occurs infrequently, step 70 proceeds wherein the controller determines that infrequent misfiring occurs in the engine.

On the other hand, in step 62, if the first parameter MMF1 is equal to or greater than the reference value JMF1, i.e., fluctuations in the angular velocity occur frequently in the engine, step 64 proceeds wherein the third parameter MMF3 is compared with a first preset reference value JMF3H. If the third parameter MMF3 is equal to or greater than the first preset reference value JMF3H, step 66 proceeds wherein the controller determines that the engine misfiring occurs frequently in a particular cylinder. Thereafter, in step 67, the misfiring cylinder is determined on the basis of a magitude of the respective counted values FU(n). In the embodiment, the misfiring cylinder corresponds to a cylinder firing just before a cylinder having a minimum counted value FU(n). If the third parameter MMF3 is less than the first reference value JMF3H, step 65 proceeds wherein the third parameter is compared with a second preset reference value JMF3L. If the third parameter MMF3 is equal to or greater than the second reference value JMF3L, step 69 is entered wherein the controller determines that the engine operates normally. If the third parameter MMF3 is less than both of the first and second reference values JMF3H and JMF3L, step 68 proceeds wherein the controller determines that the engine is misfiring frequently in a plurality of cylinders. In this manner, if engine misfiring is determined, the controller 23 memorizes the engine misfiring state and activates the warning lamp 24, for example.

As will be appreciated from the above, a precise engine misfiring determination is reached in accordance with the procedure of FIG. 11.

The controller 23 also determines whether the ring gear sensor has malfunctioned in step 9 of FIG. 6. The ring gear sensor malfunction determination routine is described in detail in accordance with the respective flowcharts of FIGS. 8, 9 and 10.

Figure 8:
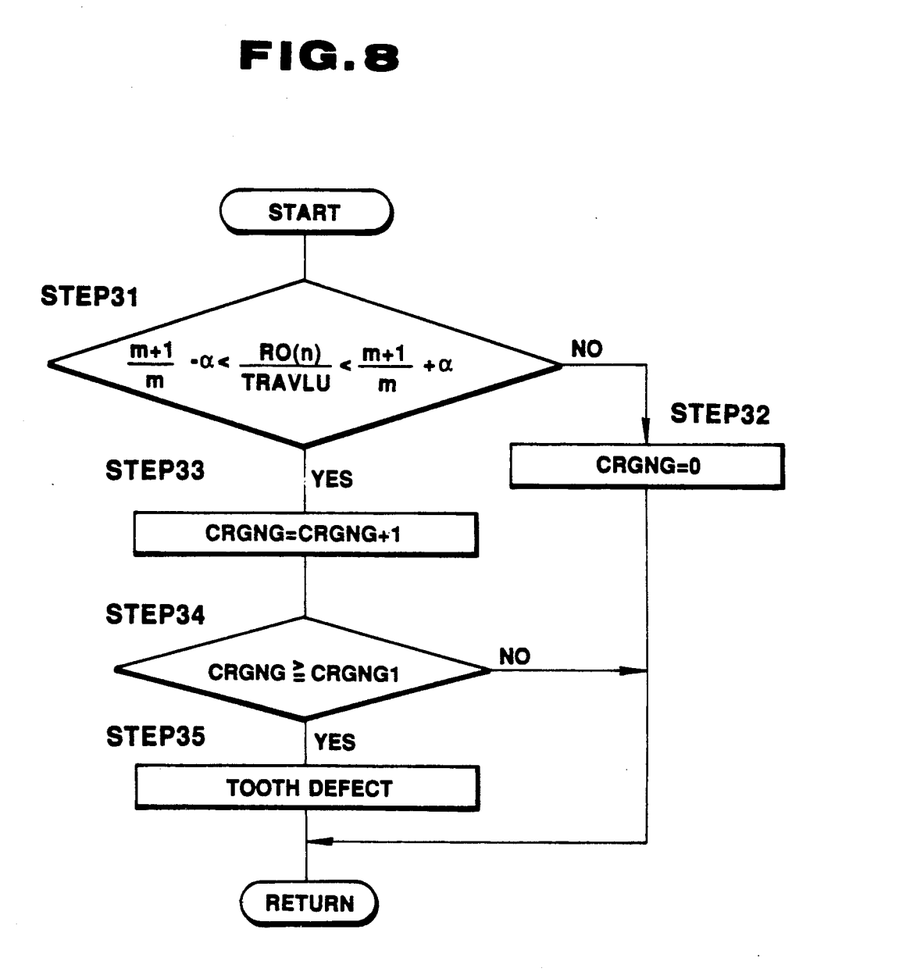
FIG. 8 is a flow chart illustrating a subroutine for determining a ring gear sensor malfunction and the number of ring gear teeth damaged or affected by a tooth defect.

Referring now to FIG. 8, a predetermined ratio of the roughness degree RO(n) and the moving average TRAVLU is compared with a predetermined ratio (m+p)/m, wherein m represents the previously noted predetermined number ($P_2-P_1$) of teeth necessary to monitor the angular velocity of the crankshaft, and p represents the number of defective teeth. Assuming that fluctuation in angular velocity does not occur at all, the following equation is generally satisfied, since the measuring time T is increased by a ratio of the number p of teeth having a tooth defect and the predetermined number m of teeth, if the ring gear has a tooth defect in the particular crank angle range for starting and ending the angular velocity measurement.

$$RO(n)/TRAVLU = (m+p)/m$$

FIG. 8 shows a procedure to determine whether the ring gear has one tooth defect in the particular crank angle range.

In step 31, a test is made to determine whether the ratio $RO(n)/TRAVLU$ is within a predetermined range $(m+1)/m \pm \alpha$. The $\alpha$ represents a predetermined allowable error in the ratio $(m+1)/m$. If the answer to the step 31 is affirmative, a value CRGNG in stored in a counter is incremented by 1 in step 33. Such a test is repeated according to a predetermined procedure cycle of FIG. 8 and the counter value CRGNG is gradually increased.

In step 34, the counter value CRGNG is compared with a preset reference value CRGNG1. If the counter value CRGNG is equal to or greater than the reference value CRGNG1, step 35 proceeds wherein the controller determines that the ring gear has a tooth defect and the number of teeth having a tooth defect is p. If the counter value CRGNG is less than the reference value CRGNG1, the procedure is returned to the step 31 again.

On the other hand, if the answer at the step 31 is negative step 32 proceeds wherein the counter value CRGNG is initialized to 0.

As appreciated from the previously noted procedure of FIG. 8, the controller 23 can precisely determine both the presence of a tooth defect in the ring gear sensor and the number of defective teeth with the result that erroneous engine misfiring detection is prevented in advance. If the tooth defect is determined in accordance with the procedure of FIG. 8, the controller stops the main program for engine misfiring detection as shown in FIG. 6 and activates a warning lamp for warning of the ring gear sensor malfunction. Alternatively, the measuring time T may be compensated on the basis of the derived number of defective teeth such that the predetermined number ($P_2-P_1$) necessary to monitor the angular velocity is compensated to $(m-1)$ if the number of defective teeth is 1. In accordance with such a compensated method, the second crank angle position expanded from the particular crank angle range by the number of defective teeth is corrected.

Figure 9:
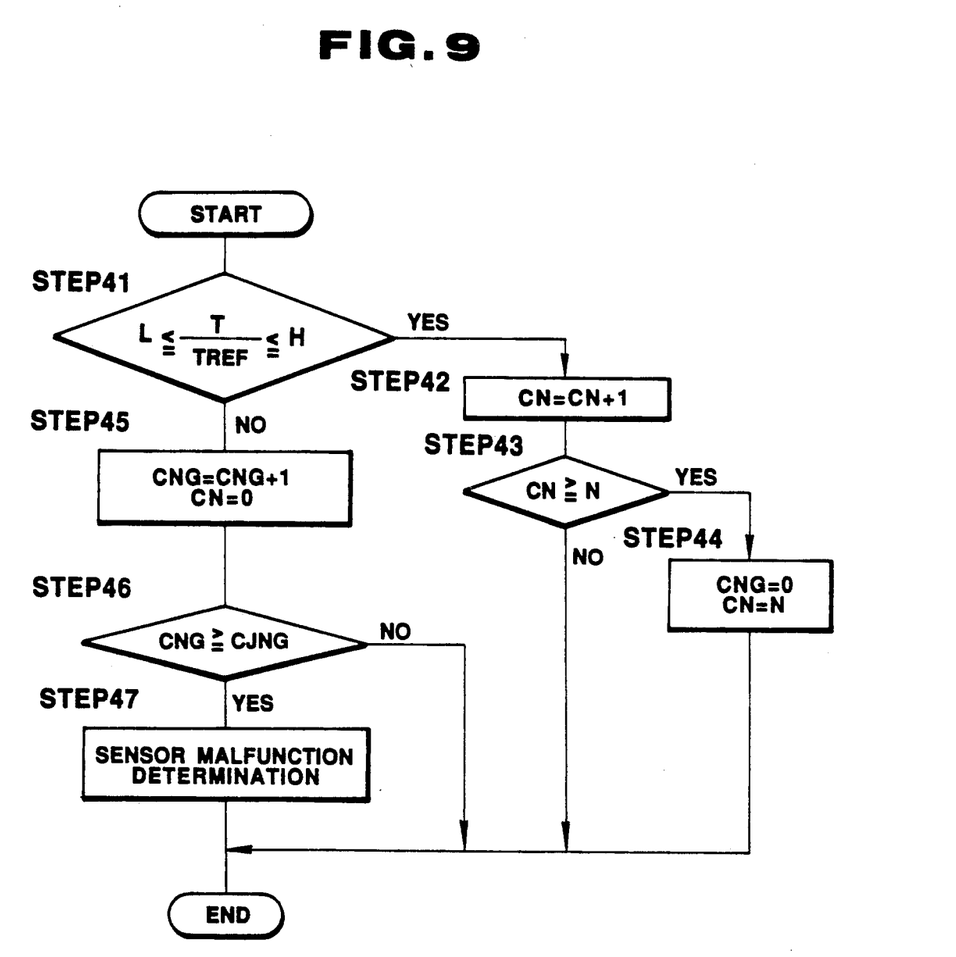
FIG. 9 is another flow chart illustrating a subroutine for determining a ring gear sensor malfunction due to a tooth defect in the ring gear utilized for monitoring fluctuations in an angular velocity of the crankshaft.

Referring to FIG. 9, the procedure is utilized only to determine whether a tooth defect of the ring gear occurs in the particular crank angle range necessary to monitor the angular velocity. As seen in step 41 of FIG. 9, introduced is a time interval $T_{REF}$ necessary to reach from a reference crank angle position of a firing cylinder to a reference crank angle position in relation to another subsequent cylinder. In the preferred embodiment, the time interval $T_{REF}$ is defined as an time interval between leading edges of the adjacent reference pulses as seen in the timing chart (a) of FIG. 2. Note that, a ratio ($T/T_{REF}$) of the measuring time T and the time interval $T_{REF}$ is held substantially constant irrespective of fluctuations in the angular velocity of the crankshaft, unless the ring gear has a defective tooth.

On the basis of the above, a test is made to determine whether the ratio ($T/T_{REF}$) is within a predetermined range being composed of an upper limit H and a lower limit L in step 41. If the answer to the step 41 is negative, step 45 proceeds wherein a counter value CNG is incremented by 1 and a counter value CN is set to 0. Thereafter, step 46 is entered wherein the counter value CNG is compared with a predetermined reference value CJNG. If the counter value CNG is equal to or greater than the reference value CJNG, the controller determines that the ring gear has a tooth defect and the ring gear sensor malfunctions in step 47.

On the other hand, if the answer in the step 41 is affirmative, step 42 proceeds wherein the counter value CN is incremented by 1. Thereafter, step 43 is entered wherein a test is made to determine whether the counter value CN is equal to or greater than the number N of all cylinders. If the answer to the step 43 is affirmative, i.e., the counter value CN reaches to the number N, the counter value CNG is initialized to 0 and the counter value CN is set to N in step 44.

Figure 10:
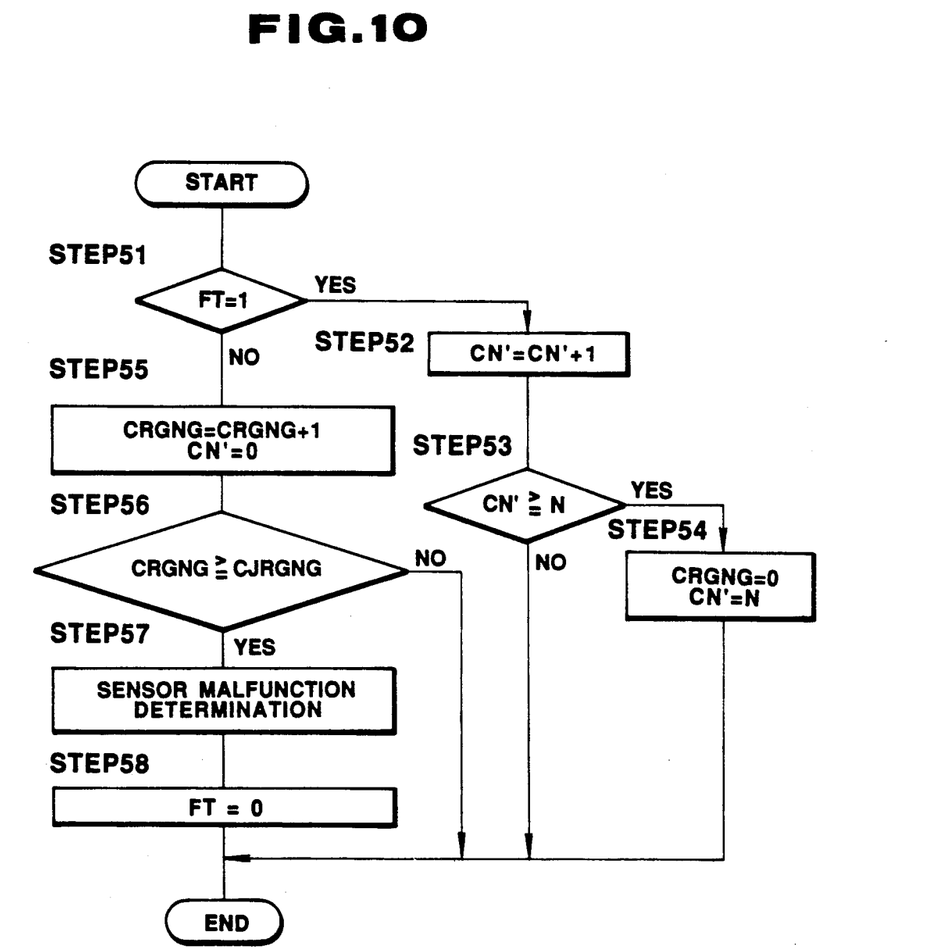
FIG. 10 is a flow chart illustrating a subroutine for determining a ring gear sensor malfunction due to a defect in a wiring harness connected to the ring gear sensor.

Referring to FIG. 10, the procedure is executed to determine whether the flag FT is set to '1' when a new reference pulse is generated from the crank angle sensor 19. In other words, the procedure is executed to determine whether the previous one complete cycle of the time T is normally completed before a next reference pulse subsequent to the previous reference pulse is generated from the crank angle sensor 19.

In step 51, a test is made to determine whether the flag FT is set to '1' when a new reference pulse is generated. If the answer to the step 51 is negative, step 55 proceeds wherein a counter value CRGNG is incremented by 1 and another counter value CN' is reset to 0. Thereafter, step 56 is entered wherein the counter value CRGNG is compared with a predetermined reference value CJRGNG. If the counter value CRGNG is equal to or greater than the reference value CJRGNG, step 57 proceeds wherein the controller determines that the ring gear sensor 22 malfunctions. Thereafter, step 58 is entered wherein the flag FT is set to '0'.

On the other hand, if the answer to the step 51 is affirmative, i.e., the flag FT is set to '1', step 52 proceeds wherein the counter value CN' is incremented by 1. The procedure of FIG. 10 is repeated in synchronization with the output of the reference pulses. If the counter value CN' reaches N (corresponding to the number of cylinders), step 54 is entered wherein the counter value CRGNG is reset or initialized to 0 and the counter value CN' is set to N. In accordance with the aforementioned procedure of FIG. 10, the controller 23 can precisely determine the ring gear sensor malfunction.

As will be appreciated from the above, erroneous engine misfiring detection is reliably prevented by detecting a ring gear sensor malfunction or a ring gear tooth defect in advance in accordance with the respective procedures of FIGS. 8, 9 and 10.

Although, in the preferred embodiment, a particular crank angle range defined between the first and second crank angle positions in each cylinder for starting and ending the angular velocity measurement corresponds to a constant phase angle and both of the first and second crank angle positions are varied according to essentially same characteristic curves as shown in FIGS. 4 and 5, the respective crank angle positions may be separately varied in accordance with different characteristic curves. In this case, the measuring time T may also be monitored in response to the slightly expanded or compressed particular crank angle range.

While the foregoing is a description of the preferred embodiments for carrying out the invention, it will be understood that the invention is not limited to the particular embodiments shown and described herein, but may include variations and modifications without departing from the scope or spirit of this invention as described by the following claims.

What is claimed is:

1. A misfiring detection system for an internal combustion engine, comprising:
    means for generating a reference pulse in synchronization with a reference crank angle position in each cylinder of the engine;
    means for monitoring a magnitude of crank angle rotated from said reference crank angle position so as to define a first crank angle position required for starting an angular velocity measurement for an engine crankshaft and a second crank angle position required for ending said angular velocity measurement;
    means for monitoring and deriving a measuring time necessary to reach from said first crank angle position to said second crank angle position;
    means for determining an engine misfiring state on the basis of fluctuations in said monitored measuring times; and
    means for variably setting said first and second crank angle positions in response to changes in an ignition timing of the engine.

2. The engine misfiring detection system as set forth in claim 1, wherein said means for monitoring the magnitude of crank angle, comprises a ring gear sensor provided in close proximity to a toothed portion formed on an outer periphery of a ring gear, for monitoring the number of ring gear teeth passing.

3. The engine misfiring detection system as set forth in claim 2, which further comprises means for determining a tooth defect in said ring gear in a particular crank angle range defined between said first and second crank angle positions, on the basis of a ratio of a first statistical data derived by dividing a deviation of a series of said measuring times by a simple mean value of the same series of said measuring times and a second statistical data derived as a moving average of said first statistical data.

4. The engine misfiring detection system as set forth in claim 3, wherein said tooth defect determining means determines that, when said ratio of said first and second statistical data is within a predetermined range defined by a formula $(m+p)/m \pm \alpha$, wherein m denotes the number of the ring gear teeth corresponding to said particular crank angle range and p denotes the number of defective teeth and $\alpha$ represents a predetermined allowable error in the ratio $(m+p)/m$, tooth defects occur for a number p of defective teeth within said particular crank angle range.

5. The engine misfiring detection system as set forth in claim 4, wherein said measuring time deriving means includes means for compensating said measuring time by correcting said second crank angle position expanded from said particular crank angle range by the number of defective teeth.

6. The engine misfiring detection system as set forth in claim 3, wherein said means for determining the tooth defect on the basis of said ratio of said first and second statistical data, includes means for determining whether one complete cycle for monitoring said measuring time in synchronization with a reference pulse terminates reliably before a next reference pulse is generated subsequently to the previous reference pulse.

7. The engine misfiring detection system as set forth in claim 2, which further comprises means for determining a tooth defect in said ring gear within a particular crank angle range defined between said first and second crank angle positions, on the basis of a ratio of said measuring time and a time interval necessary to reach from the reference crank angle position in relation to a firing cylinder to the reference crank angle position in relation to a subsequent cylinder, said time interval being defined as a time interval between leading edges of the adjacent reference pulses monitored in the vicinity of timings for starting and ending the angular velocity measurement in relation to said measuring time.

8. The engine misfiring detection system as set forth in claim 7, wherein said tooth defect determining means determines that, when said ratio of said measuring time and said time interval is within a predetermined range, the tooth defect occurs within the particular crank angle range.

9. The engine misfiring detection system as set forth in claim 7, wherein said means for determining tooth defects on the basis of said ratio of said measuring time and said time interval, includes means for determining whether one complete cycle for monitoring said measuring time in synchronization with a reference pulse terminates reliably before a next reference pulse is generated subsequently to the previous reference pulse.

10. A misfiring detection system for an internal combustion engine, comprising:
    a crank angle sensor for generating a reference pulse in synchronization with a reference crank angle position in each cylinder of the engine;
    a ring gear sensor for monitoring a magnitude of crank angle rotated from said reference crank angle position so as to define a first crank angle position required for starting an angular velocity measurement for an engine crankshaft and a second crank angle position required for ending said angular velocity measurement, said ring gear sensor provided in close proximity to a toothed portion formed on an outer periphery of a ring gear, in such a manner as to monitor the number of ring gear teeth passing;
    means for monitoring and deriving a measuring time necessary to reach from said first crank angle position to said second crank angle position;
    means for determining an engine misfiring state on the basis of fluctuations in said monitored measuring times; and
    means for determining a tooth defect in said ring gear within a particular crank angle range defined between said first and second crank angle positions, on the basis of a ratio of said measuring time and a time interval necessary to reach from the reference crank angle position in relation to a firing cylinder to the reference crank angle position in relation to a subsequent cylinder, said time interval being defined as a time interval between leading edges of the adjacent reference pulses monitored in the vicinity of timings for starting and ending the angular velocity measurement in relation to said measuring time.

11. The engine misfiring detection system as set forth in claim 10, wherein said tooth defect determining means determines that, when said ratio of said measuring time and said time interval is within a predetermined range, the tooth defect occurs within the particular crank angle range.

* * * * *